United States Patent Office 2,923,169
Patented Feb. 2, 1960

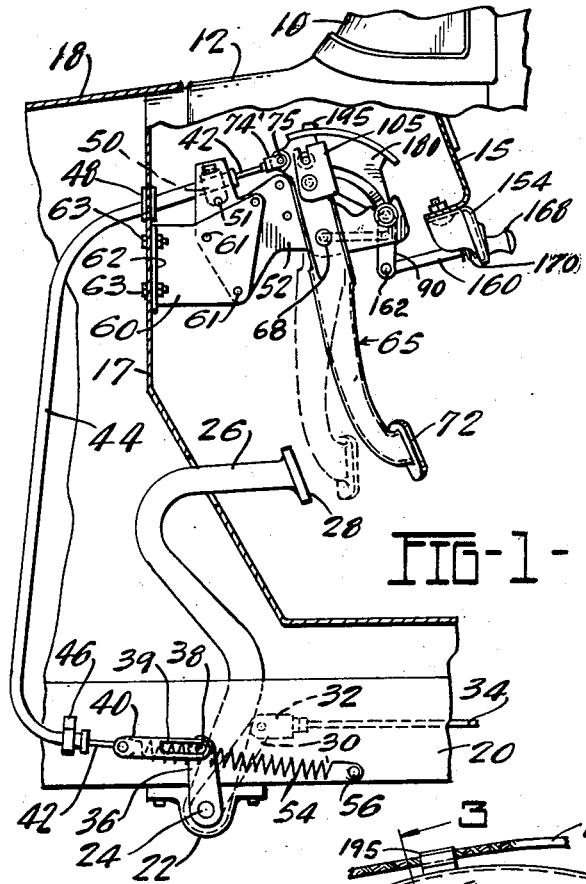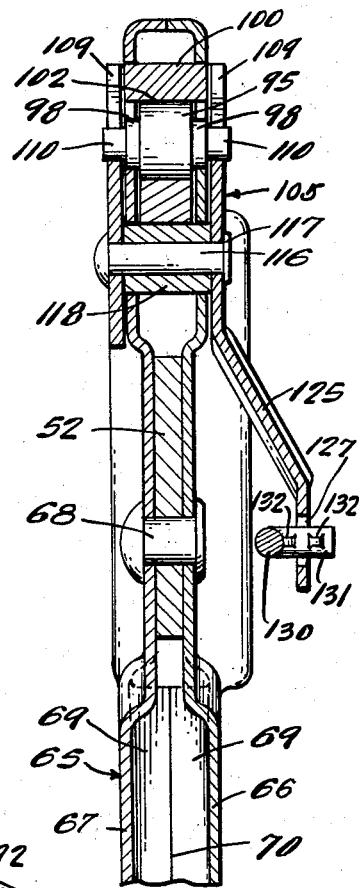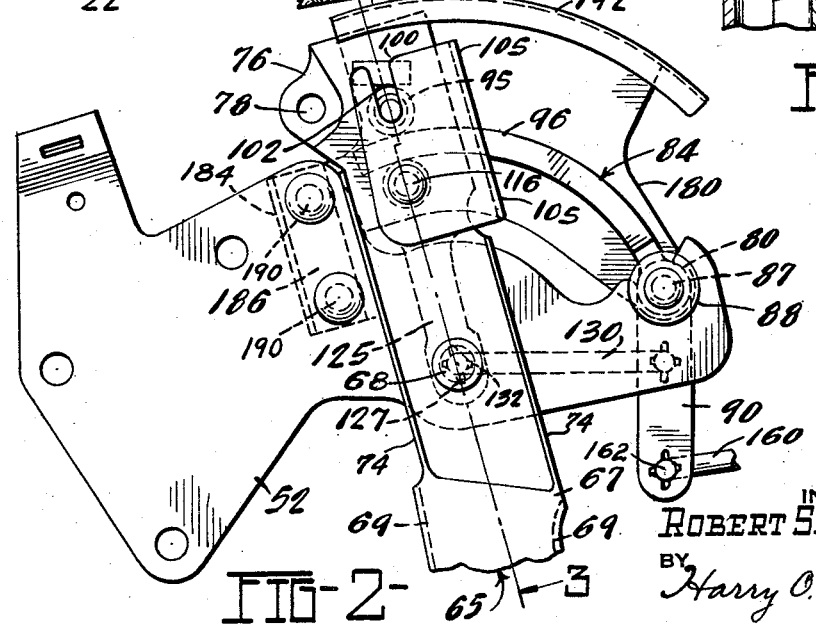

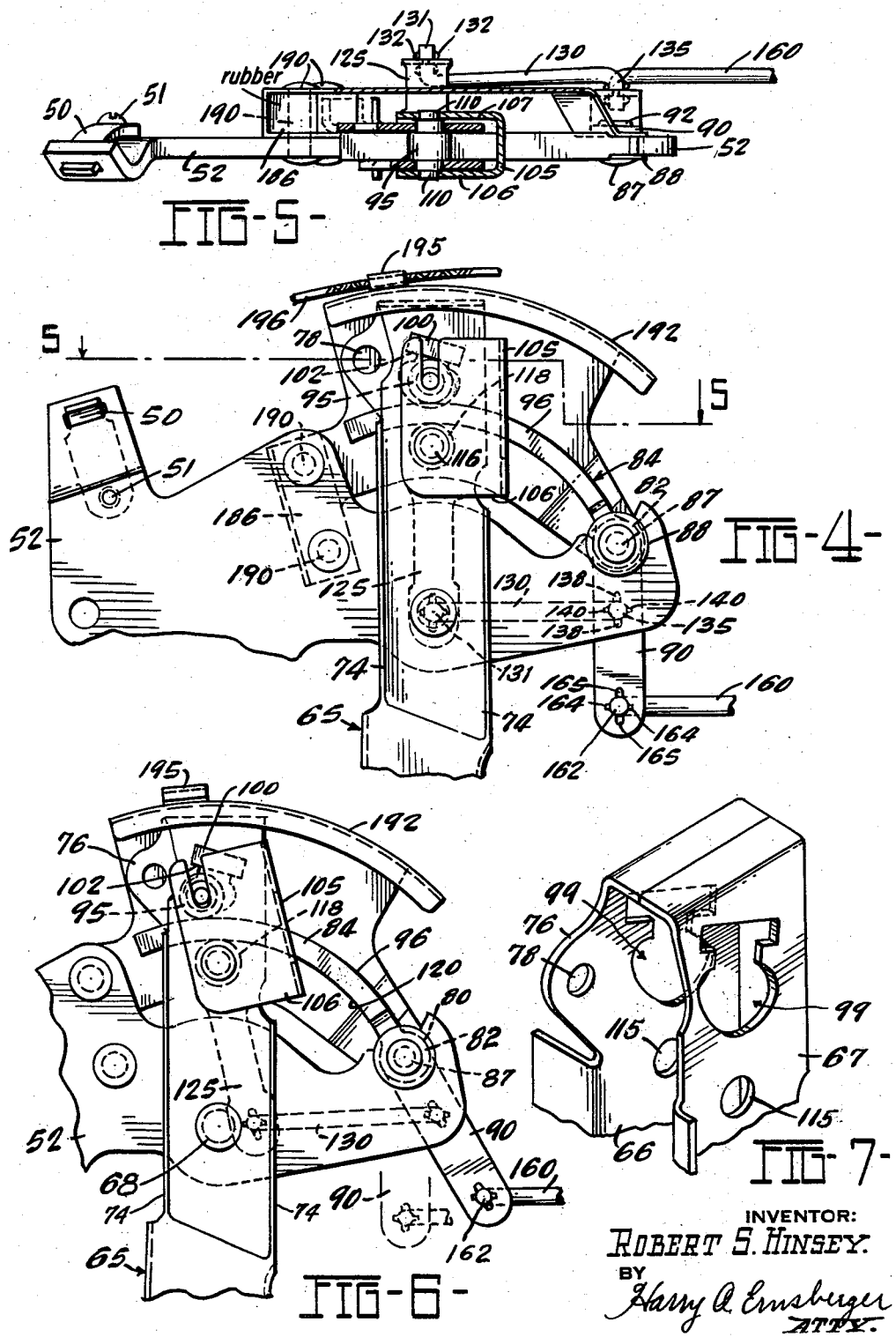

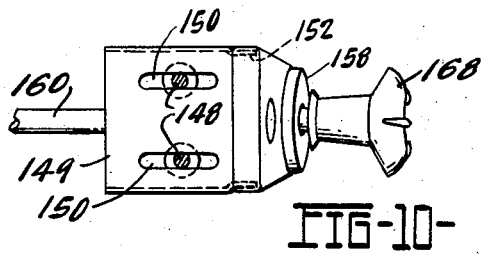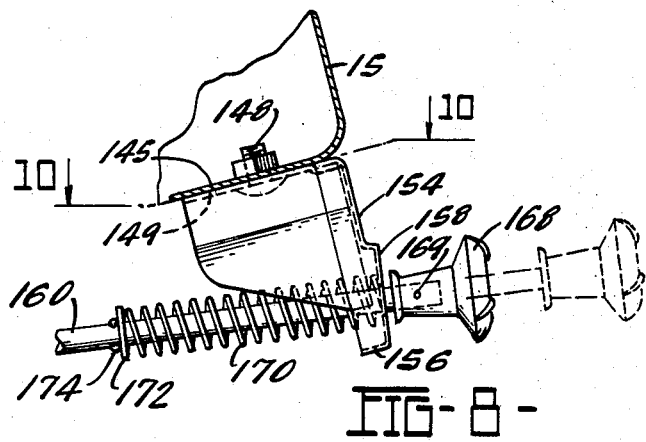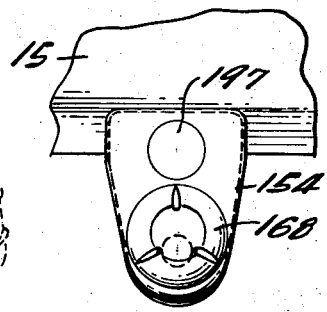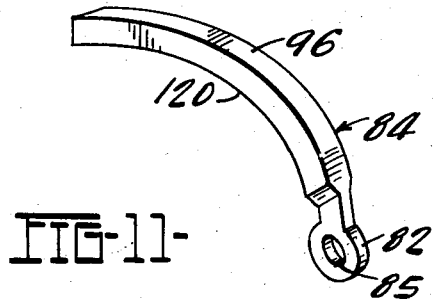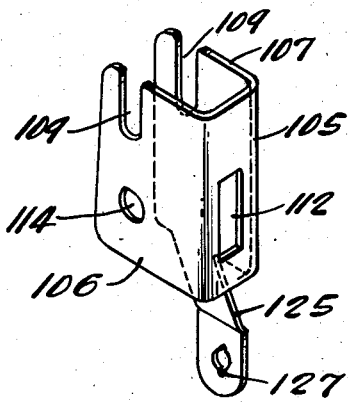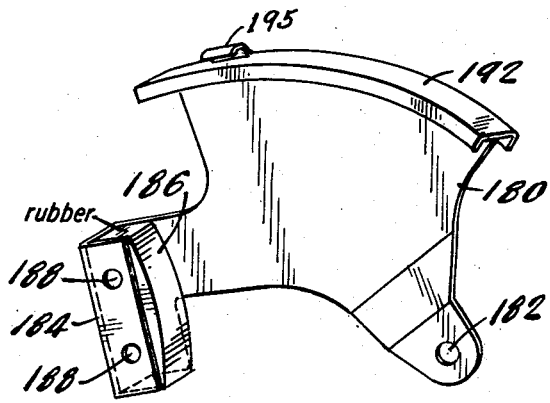

2,923,169

MECHANISM CONTROL

Robert S. Hinsey, Toledo, Ohio, assignor, by mesne assignments, to The Bingham-Herbrand Corporation, a corporation of Ohio Application August 24, 1955, Serial No. 530,250

7 Claims. (Cl. 74—531)

This invention relates to mechanism control devices and more especially to means for actuating or controlling the emergency or parking brake mechanism of a vehicle.

The invention comprehends or embraces the provision of a foot operated lever or pedal construction embodying a locking or clutch means of a character adapted to frictionally retain the lever or pedal in any position of adjustment and which may be readily released by means operable from a position remote from the lever or pedal.

An object of the invention resides in the provision of a foot operated lever construction embodying a clutch or locking means for holding or retaining a lever in brake-setting position and which may be readily released by manipulation of a control member operated through manual means readily operable irrespective of the relative position of adjustment of the lever construction.

Another object of the invention resides in the provision of a foot operated lever construction associated with clutch means for holding the lever in any position of adjustment, the arrangement embodying manually operated means operable through force or motion multiplying mechanism to effect release of the clutch means.

Another object of the invention is the provision of a foot operated brake lever construction provided with clutch means for holding the lever in various positions of adjustment in combination with manually operable means including a supplemental lever or arm for effecting release of the clutch means whereby the force required to release the clutch means is substantially reduced.

Another object of the invention is the provision of a lever mechanism for operating the parking or brake mechanism of vehicle wherein the arrangement is inclusive of a shield or guard for preventing elements disposed above the lever mechanism or foreign matter entering the region of the clutch mechanism.

Still another object of the invention is the provision of a lever construction for operating vehicle brakes wherein the major elements of the lever construction and associated components are formed of sheet metal whereby the lever construction may be economically produced in substantial quantities.

Another object is the provision of a novel means of connecting a rod to a sheet metal arm or member wherein the rod is provided with spaced projections received through slots formed in the arm or member whereby the projections are disposed at either side of the arm or member to retain the same in assembled relation.

Further objects and advantages are within the scope and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is an elevational view partially in section illustrating a portion of the operator's compartment of an automotive vehicle showing a form of mechanism control of the invention;

Figure 2 is an elevational view of a portion of the lever construction and supporting means therefor;

Figure 3 is a sectional view taken substantially on the line 3—3 of Figure 2;

Figure 4 is an elevational view similar to Figure 2 showing the lever construction in brake-setting position;

Figure 5 is a sectional view taken substantially on the line 5—5 of Figure 4;

Figure 6 is a view similar to Figure 4 showing the clutch controlling means and the clutch in released position;

Figure 7 is a fragmentary isometric view of the upper portion of the components or sections forming the lever of the invention;

Figure 8 is a side elevational view showing a form of manipulating means for manually releasing the brake mechanism;

Figure 9 is an end view of the arrangement shown in Figure 8;

Figure 10 is a view taken substantially on the line 10—10 of Figure 8;

Figure 11 is an isometric view illustrating one of the components of the locking or clutch means for the lever construction;

Figure 12 is an isometric view illustrating the clutch controlling elements; and Figure 13 is an isometric view illustrating a shield or guard for the locking or clutch mechanism of the lever construction.

While a form of the control mechanism of the invention is illustrated in association with an automotive vehicle for actuating or controlling the emergency or parking brakes of a vehicle, it is to be understood that the arrangement of the invention may be utilized for controlling other apparatus or other mechanism whenever the invention may be found to have utility.

Referring to the drawings in detail and initially to Figure 1, there is illustrated a portion of the operator's compartment of an automotive vehicle wherein numeral 10 designates a portion of a windshield, a cowl 12, an instrument panel 15, a dash board or fire wall 17 and a portion of a hood or bonnet 18 forming an enclosure for the engine compartment of the vehicle. A portion of the frame of the vehicle is illustrated at 20 to which is secured brackets 22 (one of which is shown in Figure 1), the brackets journally supporting a transversely extending shaft 24.

Fixedly secured to the shaft 24 is a service brake member or pedal 26 having foot pad portion 28 for manipulating the member or pedal 26. Secured on the shaft 24 is an arm 30 to which is pivotally connected a clevis 32, the latter being secured to a rod 34 which is arranged to be connected with the brake mechanism (not shown) of the vehicle.

Also secured on the shaft 24 is a second arm 36 provided with a transversely extending pin 38 which projects into a slot 39 formed in a member 40. An end of the member 40 is connected to one end of a flexible cable 42 which is slidably disposed within a sheath or guide 44. One end of the sheath is secured to the frame 20 by means of a bracket or clamp 46, the other end of the sheath passing through a grommet 48 secured in an opening in the dash-board 17, the other end of the sheath being secured by means of a clip 50 and a screw 51 to a plate-like member 52 (shown in Figure 5) forming a component of a supporting means for the lever construction of the invention.

A contractile coil spring 54 is connected at one end to the member 40, the other end being anchored or secured as at 56 to the frame 20. The contractile spring 54 normally biases or urges the member 40 toward brake-release position. The conventional brake mechanism of the vehicle connected with the rod 34 is equipped with spring means for biasing the brakes toward released position.

The mechanism control or brake actuating means of the invention is mounted upon a suitable support or supporting construction which includes the member 52 secured to a bracket 60 by means of bolts 61. The bracket is formed with a flange portion 62 which is secured to the dash-board or fire wall 17 by means of bolts 63.

The arrangement includes a foot operated lever or pedal construction 65 which is fulcrumed upon the support 52 by means of a stub shaft or rivet 68. The lever construction 65 in the embodiment illustrated is formed of matched or mating sections 66 and 67 formed of sheet metal. The lower portions of the sections 66 and 67 below the lever fulcrum 68 are formed with inwardly extending flanges 69 which are abutted as indicated by the line 70 in Figure 3 and are welded together along the line 70. A foot pad member 72 is welded to the lower end zone of the lever 65.

The components 66 and 67 of the lever construction are arranged to straddle a planar portion of support 52 in the manner illustrated in Figure 3. The components or sections 66 and 67 of the lever construction at the zone of straddling the support 52 are formed with outwardly extending flanges 74 forming channel-shaped configurations for strengthening the upper portion of the lever. As shown in Figure 3, the bight portions of the lever components 66 and 67 adjacent the support 52 are of planar construction, these planar portions snugly contacting the major surfaces of the support 52 to impart lateral stability to the construction.

The flexible cable 42 is equipped at its upper end with a clevis 74' which is connected by means of a pin 75 with a projecting ear portion 76 formed on section 66 of the lever construction, the pin 75 passing through an opening 78 in the portion 76. Through this arrangement the lever 65, which is of the first order of levers, is operatively connected with member 40 to set the brakes of the vehicle upon pivotal movement of the lever 65 in a clockwise direction as viewed in Figure 1 about the axis of the fulcrum pin or shaft 68.

The arrangement includes a locking means or clutch for retaining the lever 65 in brake-setting positions. The lever supporting member 52 is formed with a circularly-shaped recess or socket 80 which receives a circular disk-like portion 82 integrally formed on a relatively stationary, arcuately-shaped clutch member 84 shown in Figure 11. The disk-like portion 82 is formed with an opening 85 to receive a stub shaft or rivet 87, the rivet also extending through openings in a washer 88 and an arm or supplemental lever 90. As shown in Figure 5, the disk-like washer 88 is arranged at one side of the support 52 and the arm 90 at the opposite side of the support, the stub shaft or rivet having its end zone swaged as shown at 92 to hold these components or elements in assembled relation. The circular portion 82 of member 84 snugly fits into the recess or socket 80 for swivelling movement therein, and the arm 90 is arranged for pivotal movement about the axis of the stub shaft 87. By disposing the washer 88 and the arm 90 on opposite sides of the support 52, the member 84 is prevented from being dislodged from the socket 80.

A clutch member or roller 95 is adapted for cooperation with an arcuate surface 96 of member 84. The roller or clutch member 95 is formed with shoulder portions 98 which are disposed in generally oval-shaped slots or openings 99 formed in the upper portions of the lever sections 66 and 67 shown in Figure 7. The lever 65 is provided with an abutment or block 100 adapted for cooperation with the clutch roller 95.

The abutment 100 is formed of hardened steel or the like, the lower surface 102 of the abutment being annularly arranged with respect to the curved surface 96, the angular position of the block 100 being illustrated in Figures 2, 4 and 6. The lower surface 102 of the abutment 100 and the upper curved surface 96 of member 84 are convergently arranged so that the clutch roller 95 frictionally or wedgingly engages these surfaces to hold the lever 65 in various positions of adjustment or brake-setting positions.

Means is provided for controlling the clutch roller 95 to set and release the brake mechanism. The control means for the clutch is inclusive of a generally U-shaped member 105 having opposed parallel wall portions 106 and 107. The wall portions 106 and 107 are formed with opened-ended, parallel-walled slots 109 into which extend tenons 110 formed on the clutch roller or member 95 and projecting outwardly from the shoulder portions 98. The walls of the slots 109 are spaced to snugly accommodate the tenons 110 without appreciable lost motion, the bight portion of member 195 being formed with a rectangular opening 112 through which extends the arcuately-shaped member 84.

The walls 106 and 107 of member 105 are provided with openings 114 to receive a shaft or rivet 116 as shown in Figure 3. Mounted upon the stub shaft or rivet 116 is a cylindrical member or sleeve 118 which forms an abutment engageable with the arcuate lower surface 120 of member 84 forming an abutment for the member 85.

As shown in Figure 3, the end portion of the rivet or shaft 116 is swaged as at 117 to secure the member 105 and the abutment roller 118 in assembled relation. The upper portions of the mating sections 66 and 67 of the lever construction 65 are formed with circular openings 115 to receive the end zones of the cylindrical abutment sleeve or member 118 whereby the member 105 is journally supported upon the sleeve 118 for pivotal movement about the axis of the stub shaft 116.

The member 105 is integrally formed with an extension or arm 125 having an opening 127 formed therein which is normally substantially coincident with the axis of the fulcrum shaft 68. As shown in Figure 2, a link or rod 130 has an end portion 131 extending substantially at a right angle to the body of the rod 130 and extends into an opening 127 formed in the arm 125. Struck-up portions 132 are formed on portion 131 of the rod which pass through recesses of the opening 127 and serve to retain the portion 131 in the opening 127. The opposite end portion 135 of rod 130 extends substantially at a right angle to the body of the rod and projects through an opening formed in the arm or supplemental lever 90 intermediate its ends.

The opening in member 90, receiving the end portion 135 of rod 130, is formed with recesses 138 to accommodate struck-up or ear portions 140 for holding the rod in assembled relation with the arm 90. In assembling the rod 130 with the arm 90, the rod is disposed in parallel relation with the arm 90 in which position the struck-up portions 140 on the end 135 of the rod are received through the recesses 138 formed in the arm 90. After the rod end 135 is inserted in the opening in the arm 90, the rod is rotated to bring the struck-up portions 140 out of registration with the recesses 138 and engage opposite surfaces of the arm 90 to hold the rod in pivotal connection with arm 90. The end 131 of the rod is assembled with the extension 125 in the same manner that the rod end 135 is assembled with the arm 90. Pivotal movement of the arm 90 about its supporting shaft 87 is transmitted through the rod 130 to member 105 to cause pivotal movement of member 105 about its supporting shaft 116 to move the clutch roller 95 into or out of locking, wedging or clutching engagement with the block 100 and the arcuately shaped bar 84.

The clutch controlling or manipulating means may be disposed at a position remote to the lever mechanism and, as shown in the drawings, the manipulating means for the clutch control mechanism is disposed adjacent the instrument panel 15. With particular reference to Figures 1 and 8 through 10 there is illustrated a clutch manipulating means and mounting therefor.

The instrument panel 15 is formed with an extending flange 145, a U-shaped member or bracket 147 being secured thereto by means of bolts 148. The uniplanar bight portion 149 of the bracket 147 is in contiguous relation with the flange 145 and is provided with elongated slots 150 to accommodate the bolts 148. The slots facilitate adjustment of the bracket with respect to the instrument panel 15.

The bracket 147 is formed with offset flange portions 152 and escutcheon portion 154 of the bracket is provided with a peripheral flange 156 which embraces and snugly fits over the offset flange portions 152 of bracket 147. The overlapping flange portions are welded or otherwise secured together. The escutcheon portion of the bracket 147 is formed with a circularly shaped embossed portion 158 having an opening through which extends a rod or shaft 160. One end of the rod has a portion 162 extending at right angles to the body of the rod which projects through an opening in an end zone of the arm or supplemental lever 90. The end portion 162 of the rod is formed with struck-up portions 164 for holding the rod 160 in assembled relation with the control lever 90. The control lever 90 is formed with recesses 165 to receive the projections 164 during assembly of the rod 160 to the control lever in the same manner that rod 130 is connected to the control arm or lever 90. A portion of the rod 160 extends rearwardly of the boss portion 158 and is equipped with a manipulating button or knob 168 secured to the rod by a pin 169 or other securing means.

Surrounding a portion of the rod 160 is an expansive coil spring 170. One end of the spring abuts the boss portion 158, the other end of the spring seating against a washer 172, the position of which is determined by struck-up portions 174 formed on the rod 160 as shown in Figure 8.

The expansive pressure of spring 170 urges or biases the rod 160 in a lefthand direction as shown in Figures 1, 4 and 8 to bias the clutch control member 105 in a clockwise direction about its supporting shaft or fulcrum 116 as viewed in Figure 4 to wedgingly engage the clutch roller 95 with the cooperating clutch surface 102 of the abutment block 100 and the arcuate surface 96 of the bar or member 84. The wedging or locking engagement of the clutch roller 95 with the cooperating clutch surfaces holds the lever structure 65 in a position setting the brakes of the vehicle. The expansive force of spring 170 serves to return the rod 160 and the manipulating knob 168 to their normal positions after release of the lever means 65 has been effected.

A guard or shield means is provided for protecting the clutch mechanism from the ingress of dust as well as to provide a support for wiring harness 196 for an indicator or signal lamp (not shown) associated with the brake control mechanism. This means is inclusive of a plate or member 180 shown in detail in Figure 13 and in assembled relation with the support 52 shown in Figures 1, 2, 4 and 6. The plate 180 is provided with an opening 182 which accommodates the shaft 87, the latter forming the pivotal support for the clutch control arm or lever 90. The plate 180 is formed with a U-shaped portion 184 which forms or provides a channel shaped configuration in which is seated a block 186 of resilient material such as rubber or the like, the block forming an abutment which is engaged by the lever 65 in brake release position to limit the movement of the lever 65 in one direction.

The lever 65 in brake release position is illustrated in engagement with the abutment block 186 in Figure 2.

The walls of the channel shaped portion 184 of plate 180 are formed with openings 188 which are aligned with openings in the abutment block 186 and the support 52, the openings adapted to receive rivets 190 for securing the plate 180 to the support 52 and the abutment block 186 in its seat 184.

A cover, shroud or shield member 192 of curved configuration is welded to the plate 180. The curvature of member 192 is concentric with the curvature of the bar 84, both being generated about the axis of the lever fulcrum 68. Through this arrangement the shield plate 192 is spaced the same distance from the clutch mechanism throughout the entire range of movement of the lever 65. The curved plate 192 is disposed above the clutch mechanism including the clutch bar 84 and assists in preventing dust from collecting upon the clutch surfaces and the clutch roller.

The member 192 is formed with a raised clip or projection 195 and is arranged to engage and support the wiring harness 196. The current conductors or wiring harness 196 is connected with an illuminating means or lamp (not shown) disposed in an opening 197 in the escutcheon 154 and intercalated with a switch means (not shown) associated with the lever mechanism for indicating that the lever mechanism is in brake-set position. The switch means is arranged to close a circuit through the signal lamp to energize the latter when the lever mechanism is in set position. The circuit of the switch means and signal lamp may be intercalated with the ignition switch means of the vehicle so that the signal lamp for the brake mechanism is only energized when the ignition switch means of the vehicle is in circuit closing position.

The operation of the mechanism of the invention is as follows: The lever mechanism 65 and associated elements or components are illustrated in brake released position in Figures 1 and 2. When the vehicle operator desires to set the emergency or parking brakes of the vehicle, the foot operated lever 65 is swung in a clockwise direction as viewed in Figure 1 effecting movement of the cable 42 and rod 34 to set the brakes. The lever mechanism is shown in brake setting position in Figure 4. In this position the spring 170, shown in Figure 8, exerts pressure or force in a lefthand direction as viewed in Figures 4 and 8 and through the motion or force multiplying means including lever 90 and link or rod 130, the member 105 is biased in a clockwise direction. The walls of the slots 109 engage the tenons 110 of the clutch roller 95 to bias the roller into wedging or locking engagement with the clutch surfaces 102 and 96 of the block 100 and arcuate bar 84 respectively. Thus the roller 95, in engagement with the clutch surfaces 102 and 96, frictionally holds the lever 65 in a position setting the parking or emergency brakes of the vehicle.

When it is desired to release the brake mechanism, the vehicle operator grasps the grip member or knob 168 shown in Figure 8 and moves the rod 160 in a righthand direction as viewed in Figures 4, 6 and 8. This action compresses the spring 170 swinging the arm or control lever 90 and member 105 to the position shown in Figure 6, viz. a position in which the clutch roller 95 is moved by the walls of the slots 109 out of clutching engagement with the clutching surfaces of block 100 and arcuately shaped bar 84.

In this position of the clutch control member 105 with the clutch roller in released position, the lever construction 65 is returned to its normal brake release position under the influence of contractile spring 54 (shown in Figure 1) and the conventional spring arrangements associated with the vehicle brake mechanism. The rubber or nonmetallic bumper or buffer block 186 cushions the shock of the rapid return movement of the lever 65 to brake released position.

It will be noted with reference to Figures 2 and 4 that the zone of connection of the rod 130 with the arm 125 of member 105 is substantially coincident with the axis of the fulcrum shaft 67 so that the clutch control mechanism is operative in any position of adjustment of the lever 65. It is to be understood that a spring means for biasing the member 105 and clutch 95 toward clutching position, such as that shown in my Patent No. 2,587,725, may be connected directly between the arm 125 and the lever 65 in lieu of or supplementing the spring 170 without departing from the spirit of the invention. The arrangement provided by arm 125, control lever 90, and rods 130 and 160 provide a motion multiplying or force multiplying means for actuating the clutch roller 95 whereby the energy or force required to release the clutch roller is substantially reduced over prior mechanisms of this general character.

It is apparent that, within the scope of the invention, modifications and different arrangements may be made other than is herein disclosed, and the present disclosure is illustrative merely, the invention comprehending all variations thereof.

I claim:

1. Mechanism control for parking brakes of a vehicle including a support, a foot-operated lever fulcrumed intermediate its ends upon the support, means formed on the lever adapted for connection with the parking brakes, said lever having a foot pad portion formed at one end thereof, a clutch roller carried by the lever, clutch surfaces associated with the support and the lever arranged to be engaged by the clutch roller for retaining the lever in brake setting positions, a clutch roller control member engaging the clutch roller and pivotally supported on said lever, an arm pivotally supported at one end, a link pivotally connected with the arm intermediate its ends and pivotally connected with said member, a manipulating means connected with said arm at a region spaced from the pivotal connection with the link for operating said clutch roller control member to effect a release of the clutch roller from clutching engagement with the clutch surfaces, and resilient means for normally biasing the clutch roller into engagement with the clutching surfaces.

2. Mechanism for controlling the brakes of a vehicle including, in combination, a support, a foot-operated lever fulcrumed intermediate its ends on the support, said lever being formed with means adapted for connection with the brakes of the vehicle, an arcuately-shaped clutch surface associated with the support, clutch means carried by the lever and adapted for cooperation with the arcuately-shaped clutch surface for retaining the lever in brake-setting positions, a clutch control member carried by the lever, means connected with the clutch control member for releasing the clutch means, a sheet metal plate secured to said support and having a transversely extending shield portion disposed above the clutch means, and a resilient movement limiting means for the lever carried by said plate.

3. Mechanism for controlling the brakes of a vehicle including in combination a support, a lever formed of sheet metal fulcrumed on the support, said lever being formed with means adapted for connection with the brakes of the vehicle, an arcuately shaped bar pivoted on said support, clutch means including a roller associated with said lever and adapted for cooperation with the bar for retaining the lever in brake-setting positions, a clutch control member carried by the lever, means connected with the clutch control member for manually releasing the clutch roller from clutching engagement with the bar, a plate secured to said support and having a shield portion disposed above the clutch roller and arcuately-shaped bar, said plate being formed with a U-shaped portion, and a block of resilient material secured in the U-shaped portion for limiting movement of the lever in one direction.

4. Mechanism control for the parking brakes of a vehicle including a support, a foot operated lever fulcrumed intermediate its ends upon the support, said lever being provided with means adapted for connection with the parking brakes and having a foot pad portion at one end thereof, a locking detent carried by the lever, clutch surfaces respectively associated with the lever and the support arranged for engagement with the locking detent, a control member for the locking detent movably mounted on the lever, resilient means normally biasing the control member to bias the locking detent into engagement with the surfaces to retain the lever in brake-setting positions, a manipulating means for the control member, and motion multiplying means connecting the manipulating means with the control member.

5. Mechanism control for the parking brakes of a vehicle including a support, a foot operated lever fulcrumed intermediate its ends upon the support, said lever being formed with means adapted for connection with the parking brakes and having a foot pad at one end thereof, a locking detent associated with the lever, surfaces respectively associated with the support and the lever arranged for cooperation with the locking detent, a control member for the locking detent pivotally mounted upon the lever, resilient means biasing the control member to engage the locking detent with the surfaces to retain the lever in various positions of adjustment, a manipulating rod, and a supplemental lever pivoted by the support and connected with the control member, said manipulating rod being connected with the supplemental lever.

6. Mechanism for controlling the parking brakes of a vehicle including, in combination, a bracket, a foot operated lever fulcrumed intermediate its ends on the bracket, said lever being formed with means adapted for connection with the parking brakes of the vehicle, means carried by the lever and cooperating with surfaces associated with the lever and the bracket for retaining the lever in brake-setting positions, means for controlling the operation of the lever retaining means carried by the lever including a supplemental lever pivotally mounted by the bracket, means connecting the supplemental lever with the lever retaining control means, an operating rod connected to the supplemental lever at a region spaced from the means connecting the supplemental lever with the lever retaining control means, and resilient means normally biasing the lever retaining means carried by the lever into engagement with the surfaces.

7. Mechanism control for the parking brakes of a vehicle including a support, a foot operated lever fulcrumed intermediate its ends upon the support and having a foot pad portion provided at one end thereof, said lever being formed with means adapted for connection with the vehicle parking brakes, a clutch roller associated with the lever, surfaces associated with the lever and the support arranged to be engaged by the clutch roller, a control member for the clutch roller movably supported upon the lever, resilient means normally biasing the control member to engage the clutch roller with the surfaces to retain the lever in various positions of adjustment, a rod mounted independently to the lever support, and means including motion multiplying linkage connecting the manipulating rod with the control member for the clutch roller.

(References on following page)

References Cited in the file of this patent

UNITED STATES PATENTS

| | | | |
|---|---|---|---|
| 712,392 | Lean | Oct. 28, | 1902 |
| 1,279,516 | Collins | Sept. 24, | 1918 |
| 1,407,802 | Olinger | Feb. 28, | 1922 |
| 1,433,023 | Morris | Oct. 24, | 1922 |
| 1,539,796 | Kirst | May 26, | 1925 |
| 1,840,960 | Krueger | Jan. 12, | 1932 |
| 1,876,498 | Hawkins | Sept. 6, | 1932 |
| 2,014,300 | Strobridge | Sept. 10, | 1935 |
| 2,141,266 | Dickerson | Dec. 27, | 1938 |
| 2,299,508 | Skareen | Oct. 20, | 1942 |
| 2,361,361 | Sarnes | Oct. 24, | 1944 |
| 2,507,997 | Roedding et al. | May 16, | 1950 |
| 2,567,571 | Merriman | Sept. 11, | 1951 |
| 2,587,725 | Hinsey | Mar. 4, | 1952 |
| 2,619,846 | Wales et al. | Dec. 2, | 1952 |
| 2,654,206 | Dobrowski | Oct. 6, | 1953 |
| 2,694,945 | Jandus | Nov. 23, | 1954 |

FOREIGN PATENTS

| | | | |
|---|---|---|---|
| 87,317 | Switzerland | Nov. 16, | 1920 |